PARAFFIN WAX COMPOSITIONS

Thomas B. Richey, Westfield, and Clarence W. Spilker, Warren, N.J., assignors to Malmstrom Chemical Corp., Linden, N.J.
No Drawing. Filed Feb. 12, 1970, Ser. No. 11,012
Int. Cl. C08h 9/00
U.S. Cl. 106—270                    5 Claims

ABSTRACT OF THE DISCLOSURE

Wax compositions suitable for use in candle manufacture, and in the production of wax coated paper and paperboard, etc., are provided by blending paraffin wax with limited amounts, viz, 5 to 25 weight percent, of lanolin wax of specified properties.

---

This invention relates to petroleum wax compositions and is more particularly concerned with improved paraffin wax compositions exhibiting superior performance characteristics under the conditions encountered in their use for various purposes or products.

Paraffin waxes have long been used for numerous purposes in industry. Among the latter are the manufacture of candles, the production of coated paper and paperboard in the manufacture of containers, and as sealing material for paper.

Normal paraffin waxes possess melting points in the range of about 120 to about 150° F. They are characterized by a highly crystalline nature and by their relative brittleness. Accordingly, these and other of the physical properties or characteristics of paraffin wax require modification to a greater or lesser degree in order to provide compositions suitable for the above-mentioned as well as other purposes.

To that end, the normal paraffin waxes have been treated or modified by mixing them with various substances. Thus, it is known to modify paraffin wax by mixing or blending it with substantial amounts of various other materials, such as microcrystalline wax; montan wax and certain derivatives thereof; stearic and other fatty acids; and olefin polymers. Illustrative of such blended wax compositions are those referred to in the following patents, namely, Nos. 1,676,617; 2,282,375; 2,322,198; 2,638,411; 2,734,365; 2,846,330; 2,943,991; 2,967,781; 3,014,003; and 3,023,156.

In some of the aforementioned modifications of paraffin wax, the additive substance serves to bring about an elevation of the melting point of the paraffin wax.

Although the substances mentioned above and disclosed in the aforementioned patents as additives or modifying agents for blending with paraffin wax serve, to a greater or lesser extent, their intended purpose of imparting hardness and in some instances a reduction of the brittleness of paraffin wax, the paraffin wax compositions made from such blends leave much to be desired, from the standpoints of the composition of the blend and the mode of use thereof.

The principal object of the invention is to provide petroleum wax compositions adapted for various uses and exhibiting physical properties rendering the compositions more suitable for such uses than those possessed by paraffin wax compositions heretofore proposed or utilized for such purposes.

A more specific object of the invention is to provide a paraffin wax composition wherein certain of the normal physical properties or characteristics of the paraffin wax are modified by blending the wax with a substance capable of imparting to the blended composition a hardness and flexibility such as to render the composition more suitable for use in candle making, and for such purposes as the coating of paper and container board, and as sealing wax for the coating of waxed paper.

Still another object of the invention is to provide paraffin wax compositions which may be produced by blending paraffin wax with a relatively small quantity of the blending agent, for the production of wax compositions possessing the desired characteristics of hardness and flexibility.

It has been found, in accordance with the present invention, that paraffin wax compositions of the aforementioned character may be produced by blending paraffin wax with relatively small amounts of lanolin wax. The lanolin wax preferably utilized in accordance with the invention is a relatively high melting point (120–126° F.) wax made from anhydrous lanolin. The wax is made from such lanolin by a solvent crystallization process, preferably the process described in U.S. Pat. No. 2,758,125.

The lanolin wax utilized in carrying out the invention is a light, cream color waxy solid conforming with the U.S.P. purity specifications (except for melting point) for lanolin and is a chemically unmodified lanolin. More specifically, it consists of the higher melting lanolin fatty acid esters of cholesteral and of the other naturally occurring lanolin sterols. It is practically odorless, does not possess the characteristic odor of lanolin, and is not subject to oxidation or rancidity.

It is a significant characteristic of the lanolin wax utilized for modifying paraffin wax in accordance with the invention, that it functions in such paraffin wax formulations to inhibit crystallization of the wax and to provide smoother spreading compositions.

More specifically, the lanolin wax referred to above and constituting the blending agent for modifying paraffin wax in accordance with the invention, is characterized by the following typical analysis:

Free fatty acid (U.S.P. as oleic) ____ 0.56% max.
Color (Gardner-Hellige) _____ 7 max.
Odor _____ Bland.
Melting range (U.S.P.) _____ 49–52° C.
Saponification value _____ 90–110.
Hydroxyl value _____ 25–35.
Ash (U.S.P.) _____ 0.10 max.
Iodine number _____ 18–36.
Loss on drying _____ Less than 0.25% U.S.P.

It has been found, in accordance with the present invention, that by blending paraffin wax with about 5% to 25%, preferably about 5% to 15%, of the above-described lanolin wax, there may be obtained paraffin wax compositions exhibiting a marked improvement of strength (modulus of rupture) and flexibility, as compared to the untreated paraffin wax. The increase in the modulus of rupture of the blend of paraffin wax and waxy fraction of lanolin, is such as to render the composition considerably more suitable for such purposes as in the making of candles, and as coatings for paper, including milk carton stock, as well as for other coating uses such as paperboard, to improve the strength, adhesion, and other properties of the coating. The lanolin wax imparts a glossy finish and materially increases the fracture resistance of the paraffin wax.

The use of the above-described lanolin wax for blending with paraffin wax does not appreciably darken the paraffin wax when the lanolin wax is utilized in percentages up to about 15% by weight of the composition. An unexpected result of blending the paraffin wax with the herein-described lanolin wax, particularly in the preferred proportions herein set forth, is that there is thereby obtained a wax mixture exhibiting a penetration (a measure of hardness) slightly lower than that of the unblended paraffin wax. Thus, as will appear from the tabulation below, the penetration of the paraffin wax is reduced from 14.5 to 13.2 at 77° F. when 5% of the lanolin wax is used; and from 97 to 82.7 at 100° F. when the same amount of lanolin wax is used.

When 8% of lanolin wax is blended with the paraffin wax, the modulus of rupture of the composition shows an increase of well over 100%, compared to that of the unblended paraffin wax.

Equally significant in the affected properties of the paraffin was resulting from the addition of the above-described lanolin wax thereto is the reduction of the brittleness of the paraffin wax. Manifestly, with the reduced brittleness the paraffin wax compositions resulting from the blending of the lanolin wax with the paraffin wax, candles and other products made from or utilizing the thus blended paraffin wax, exhibit a much lower than normal tendency to fracture or break upon impact, than do the products made from the unblended paraffin, or from the paraffin mixed with other blending agents heretofore utilized. Moreover, the favorable effects upon the brittleness and hardness of the paraffin wax are obtainable with a considerably lower proportion of the lanolin wax than is usually required when using the substances above-mentioned. Thus, the aforesaid characteristics may be obtained in a composition composed of paraffin wax blended with from 5% to 15% of the lanolin wax herein referred to, whereas those characteristics are obtainable in blends of the same paraffin wax with the heretofore used blending agents above mentioned, only when used in percentages of the order of about 25 to 50%.

In the following tabulation are set forth some of the significant data with respect to the physical properties of wax compositions made by blending various proportions of the hereindescribed lanolin wax with a conventional paraffin wax.

taining 5 weight percent of the lanolin wax—i.e., 13.2 pen. (at 77° F.), compared to 14.5 pen. (at 77° F.) for the unblended paraffin wax. The change in the hardness with that percentage of lanolin wax is more noticeable at 100° F,. the penetration at the latter temperature being 82.7 in the case of the blended wax composition as compared to 97 in the case of the unblended paraffin wax.

It will be still further noted that the drop melting points as well as the congealing points for the paraffin wax and for the lanolin wax are closely similar to one another. Blending the paraffin wax with the lanolin wax reduces the melting points of the paraffin wax to a relatively minor extent, varying from a fraction to only several degrees F.

The foregoing effect is in marked contrast to the effects secured by blending agents, such as those above mentioned, heretofore incorporated with paraffin wax. With the aforementioned blending agents, the patentees sought to secure a substantial increase in the melting point of the paraffin wax.

We claim:

1. A wax composition consisting essentially of a uniform blend of approximately 90 to 95 weight percent of paraffin wax with 10 to 5 weight percent of a solid waxy fraction of lanolin, said fraction of lanolin being sufficient to impart substantial strength to the paraffin wax and to decrease the normal brittleness of the wax, the thus blended composition being characterized by a modulus of rupture of the order of about 160 p.s.i. to about 240 p.s.i., compared to a modulus of rupture of the order of about 115 p.s.i. for unblended paraffin wax of said composition.

2. A wax composition as defined in claim 1, wherein said solid waxy fraction of lanolin comprises about 8% of the composition.

3. A wax composition as defined in claim 1, and further characterized by a modulus of rupture more than twice the modulus of rupture of said paraffin wax component of the composition (ASTM–D–2004).

TABLE NO. 1
Physical Properties of Paraffin Wax Modified with Lanolin Wax

| Lanolin wax content, weight percent | Color (Gardner Hellige) | Congealing point (ASTM D 938), ° F. | Drop melting point (ASTM D 127), ° F. | Needle penetration (ASTM D 1321) at 77° F. | Needle penetration (ASTM D 1321) at 100° F. | Modulus of rupture (ASTM D 2004), p.s.i. |
|---|---|---|---|---|---|---|
| 0 | 1 | 123.0 | 125.5 | 14.5 | 97.0 | 113 |
| 1 | 1 | 123.0 | 124.9 | 13.7 | 86.0 | 136.5 |
| 5 | 1 | 122.0 | 124.6 | 13.2 | 82.7 | 159.8 |
| 8 | | | | | | 241.3 |
| 10 | 1 | 122.0 | 123.5 | 14.5 | 89.6 | 230.2 |
| 15 | 1–2 | 121.0 | 123.0 | 14.2 | 90.4 | 179.9 |
| 18 | | | | | | 200.6 |
| 20 | 1–2 | 120.0 | 122.4 | 15.5 | 97.9 | 223.7 |
| 25 | 2–3 | | | 17.1 | 103.1 | 242.8 |
| 50 | 4–5 | 118.0 | 122.5 | 22.5 | | (¹) |
| 80 | 5–6 | 119.9 | 126.3 | 27.9 | | |
| 100 | 6–7 | 120.0 | 125.2 | 60.5 | 213.2 | |

¹ Flexible—does not break.

As will be noted from the data in the foregoing tabulation, the properties of the paraffin wax are unexpectedly and appreciably affected in a favorable direction, particularly when considered from the standpoint of the use of the resultant compositions for the above-mentioned purposes, when the paraffin wax is blended with from about 5% to about 10% lanolin wax. Thus, for example, as indicated by the data, approximately 8% of lanolin wax serves to effect an increase of considerably more than 100% in the modulus of rupture of the unblended paraffin wax.

It will be further noted from the data in the tabulation that maximum hardening (as measured by needle penetration) of the paraffin wax is obtained with a blend con- 4. As a new article of manufacture, a candle produced from the wax composition defined in claim 1.

5. Paperboard having a surface thereof coated with a wax coating consisting essentially of the composition defined in claim 1.

References Cited

Schoenholz, D., et al., Wax Dispersions, Soap & Chem. Specialties, January 1958, vol. I, pp. 92, 93, 95 and 103.

Warth, A. H., The Chem. & Tech. of Waxes, pp. 468, 469 and 658.

Robinson-Waknek Product, bull. No. 31, October 1962.

THEODORE MORRIS, Primary Examiner